(12) United States Patent
Fieffer

(10) Patent No.: US 6,260,664 B1
(45) Date of Patent: Jul. 17, 2001

(54) PRESS LUBRICATION SYSTEM MODIFICATION

(75) Inventor: James O. Fieffer, Westminster, CA (US)

(73) Assignee: R.R. Donnelley & Sons Company, Chicago, IL (US)

( * ) Notice: Subject to any disclaimer, the term of this patent is extended or adjusted under 35 U.S.C. 154(b) by 0 days.

(21) Appl. No.: 09/435,535

(22) Filed: Nov. 5, 1999

Related U.S. Application Data

(60) Provisional application No. 60/109,720, filed on Nov. 24, 1998.

(51) Int. Cl.[7] ................................................. F16N 27/00
(52) U.S. Cl. ........................... 184/7.4; 184/45.1; 184/81; 137/271; 137/625.69
(58) Field of Search ..................................... 184/7.4, 45.1, 184/74, 79, 81, 6.12; 137/271, 625.69, 625.33, 625.34

(56) References Cited

U.S. PATENT DOCUMENTS

| | | | |
|---|---|---|---|
| 2,837,174 | | 6/1958 | Lyden ........................................ 184/81 |
| 3,618,709 | | 11/1971 | Boelkins ................................. 184/6.4 |
| 3,727,877 | * | 4/1973 | Beguiristain ............................ 251/30 |
| 3,785,706 | * | 1/1974 | Vangalis ................................. 184/45.1 |
| 4,572,331 | * | 2/1986 | Powell et al. ........................... 184/7.4 |
| 4,577,661 | * | 3/1986 | Melrose et al. ................... 137/625.33 |
| 4,955,953 | | 9/1990 | Kayser ..................................... 184/42 |
| 5,029,672 | | 7/1991 | Witczak ................................. 184/7.4 |
| 5,217,085 | * | 6/1993 | Barrie et al. ......................... 184/6.12 |
| 5,584,361 | | 12/1996 | Cisko et al. ........................... 184/7.4 |
| 5,749,439 | * | 5/1998 | Van Maannen ...................... 184/6.12 |
| 6,065,487 | * | 5/2000 | Watson ................................. 137/271 |

* cited by examiner

Primary Examiner—David A. Bucci
Assistant Examiner—Chong H. Kim
(74) Attorney, Agent, or Firm—Fitch, Even, Tabin & Flannery

(57) ABSTRACT

A new and improved grease shunt valve and lubrication system for a printing press or the like is achieved by the adding of vent drains and/or seals to prevent the accumulation of a waxy-like residue from the grease that interfered with operation of a return spring for closing of the valve. An existing solenoid, operated, grease shunt valve may be retrofitted with an additional body portion having a grease drain vent therein and a seal that seals grease from flowing along a solenoid, actuating rod and into the solenoid core. Preferably, an end plug that seals one end of the return spring is drilled to provide the drain vent for grease flowing into the spring chamber. Vent holes may also be drilled into the solenoid housing to drain and vent grease flowing into the solenoid core.

11 Claims, 3 Drawing Sheets

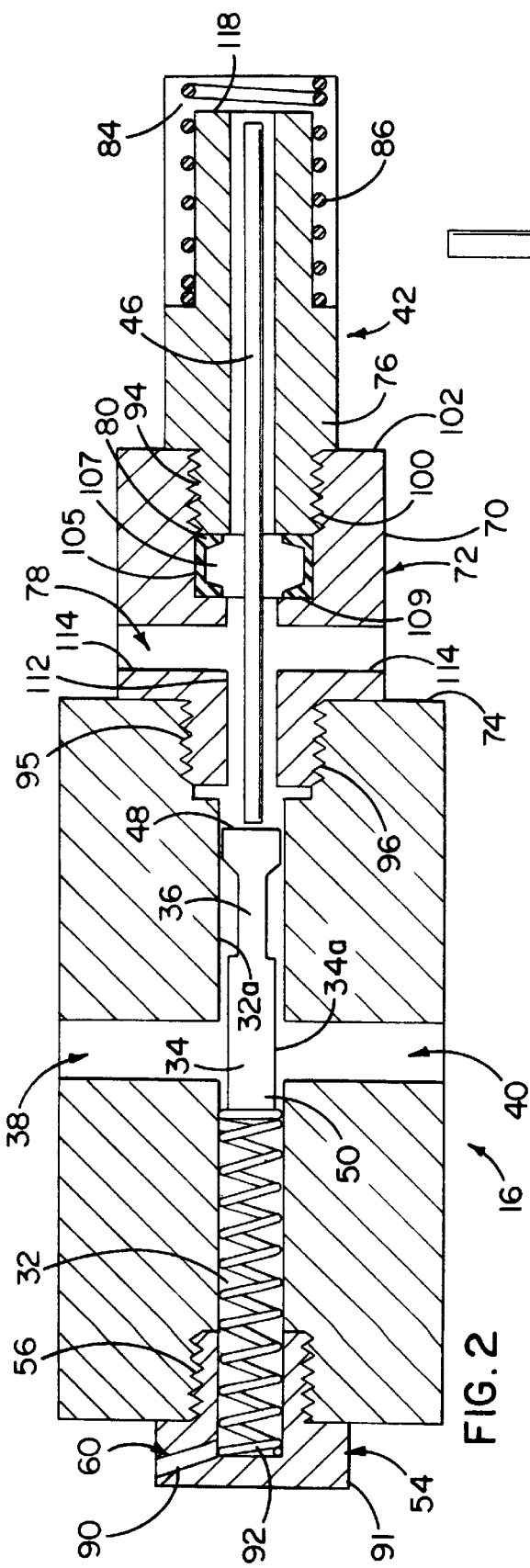
FIG. 2
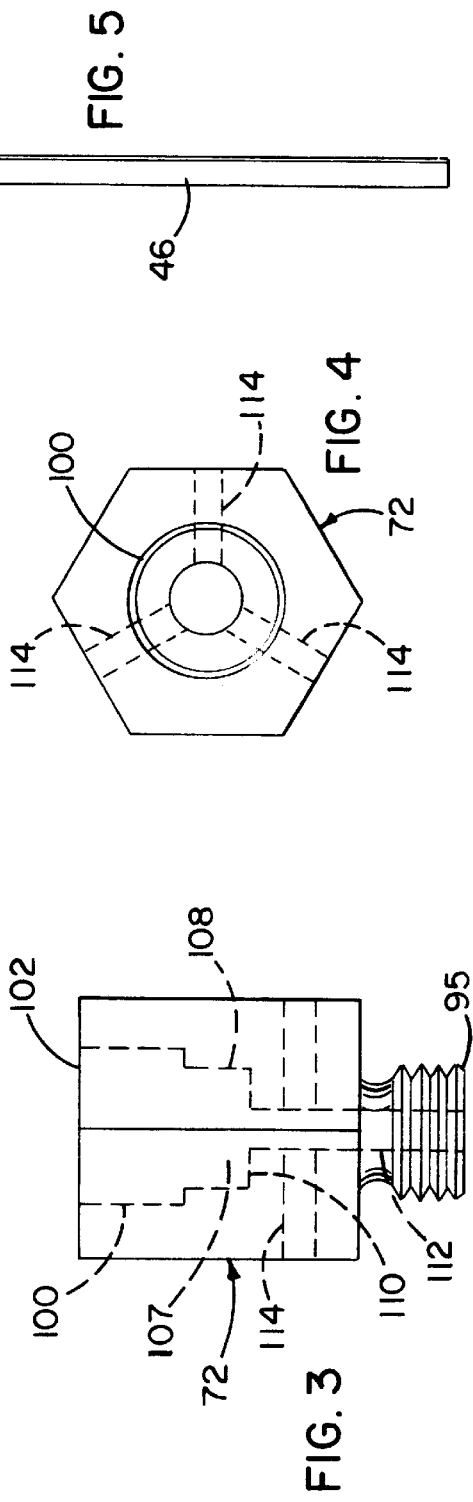
FIG. 5
FIG. 4
FIG. 3

PRESS LUBRICATION SYSTEM MODIFICATION

RELATED APPLICATIONS

This application is based on, and claims benefit of, U.S. Provisional Application Ser. No. 60/109,720 filed on Nov. 24, 1998.

FIELD OF THE INVENTION

This invention relates to a lubrication shunt valve and to a printing press having a lubrication system employing lubrication valves therein.

BACKGROUND OF THE INVENTION

Printing machines or presses have a large number of rotating cylinders, rollers and other rotating mechanical components operating at high speed with mechanical bearings, bushings or the like that need lubrication. One common lubrication system employs an electrical control system for operating electro-magnetically operated valves to control the flow of grease to the points needing lubrication in a timed and controlled manner. These valves are called "inlet shunt valves", and they are solenoid operated valves which have solenoids electrically energized to shift the valves to an open or closed position. One particular lubrication system is a TRABON lubrication system that uses a solenoid shunt valve having an internal spool that is shifted to an open position by energization of the solenoid coil to allow grease to flow through the valve to the printing press lubrication points. An internal spring in the valve works in opposition to the solenoid and returns the valve to the closed position when the solenoid coil is de-energized. One such type of valve is called a "Lubriquip" shunt valve.

It has been found in use that these solenoid shunt valves were failing and causing the presses to be stopped with a consequent loss of press time. Also, the lubrication points were not being lubricated properly. The detection of a fault in the lubrication system also can and did cause "speed inhibits" faults that notified the operator to hold the presses down until the fault was cleared. Thus, there is a need for a new and improved grease shunt valve and system that has fewer problems. There may be as many as sixteen or more shunt valves on a single printing press. This represents sixteen opportunities during a press run for a detection of a fault in the lubrication system due to a faulty shunt valve.

SUMMARY OF THE INVENTION

In accordance with the present invention, there is provided a new and improved lubrication shunt valve and lubrication system employing such a shunt valve. This is achieved by venting the shunt valve body to allow grease to vent from about the return spring, and preferably, also to vent before the grease reaches the solenoid. The venting of the grease prevents the accumulation to waxy-like, grease residue in the shunt valve that interferes with the closing of the valve and thereby a lowering of grease pressure, which, upon detection, caused a fault condition for the printing press.

The illustrated and preferred lubrication shunt valve was provided with an additional valve body portion between the solenoid coil and the spool with grease vent openings in this additional portion. Preferably, a wiping seal is provided in the additional portion to wipe the solenoid plunger rod in order to limit the flow of grease along the plunger rod and into the solenoid coil. Because the additional body portion adds additional length between the spool and solenoid, a new and longer plunger rod was added to extend between the spool and the coil of the solenoid. Preferably, a vent was also provided in the solenoid valve body to allow grease to flow from the solenoid's body to limit accumulation of grease residue in the solenoid body.

In order to prevent accumulation of grease about the return spring and the eventual accumulation of a wax-like residue about the return spring (which prevented the return spring from fully closing the valve), vents were formed in an end cap or plug in the valve body against which abutted an end of the return spring. Thus, grease flowing past the spool and into the chamber or bore containing the spring was free to pass outwardly from the spring to the external side of the plug and valve body. The vents can be inexpensively made in the plug by drilling holes therein.

Existing lubrication shunt valves of this kind can be inexpensively and quickly retrofitted by drilling holes in the plug, and by adding the additional venting and seal body portion between the main valve body and the solenoid. A longer plunger rod is needed to actuate the spool, and the preferred actuating rod is circular in cross-section to be sealed by an annular wiping seal. Thus, an existing lubrication shunt valve may be quickly and inexpensively retrofitted in this manner.

BRIEF DESCRIPTION OF THE DRAWINGS

FIG. 2 is a cross-section of a shunt valve constructed in accordance with the preferred embodiment of the invention;

FIG. 3 is an elevational view of the additional valve body portion;

FIG. 4 is a plan view of FIG. 3;

FIG. 5 is an elevational view of an elongated, spool-activating rod;

DETAILED DESCRIPTION OF THE PREFERRED EMBODIMENT

Figure 1:
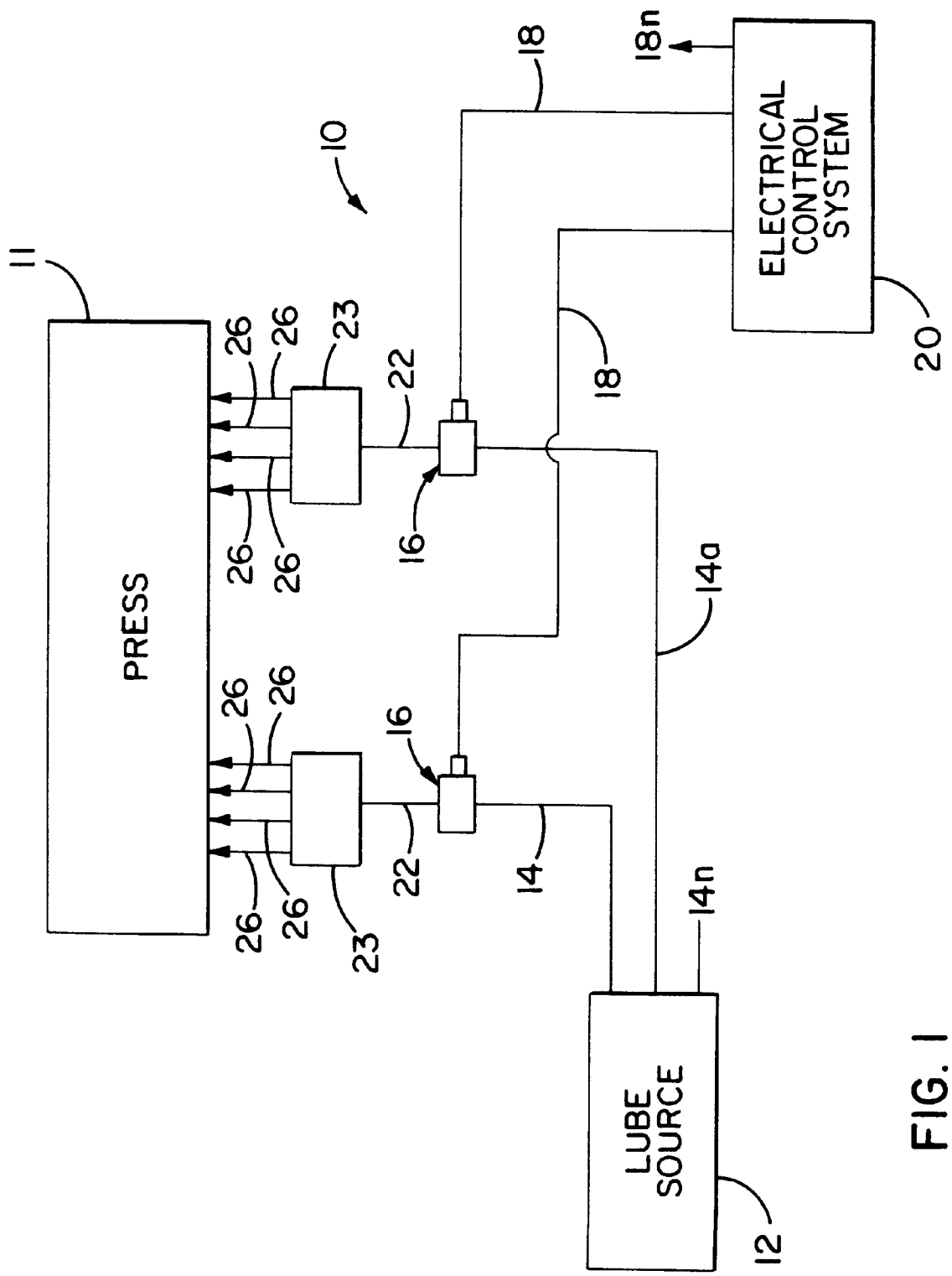
FIG. 1 is a diagrammatic view of a printing press or printing unit with a lubrication system having shunt valves therein.

As shown in the drawings for purposes of illustration, the invention is embodied in a lubrication system 10 for a printing unit or printing press 11 or other equipment having rotatable cylinders, rollers or other equipment having bearings or bushings that are supplied with a lubricant under pressure from a lubrication source 12. In the lubrication system, grease is supplied over main grease lines 14, 14a, etc., to shunt lubrication valves 16 which are solenoid operated valves having electrical leads 18 connected to an electric controller or control system 20. The electric controller 20 controls the electrical energization and de-energization of the solenoids to switch the valves between open and closed positions. In the open position, grease flows through the main grease lines and through the valves to outlet lines 22, which extend to feeder blocks 23, which distribute grease over grease lines 26 in preset amounts to grease lubrication points such as bearings or bushings (not shown) in the press 11.

Figure 6:
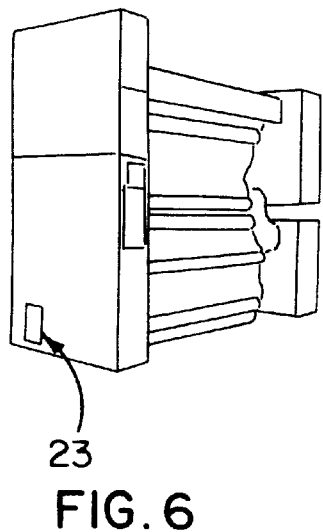
FIGS. 6 and 7 illustrate feeder blocks on opposite sides of a printing unit.
Figure 7:
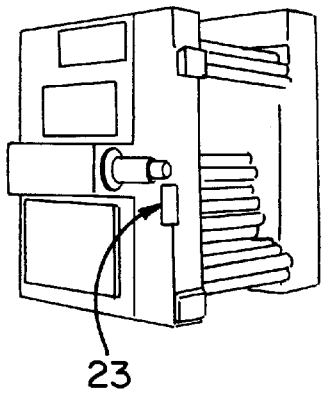

By way of example only, a press such as manufactured by Heidelberg Web Press, Inc., as shown in FIGS. 6 and 7, may have two feeder blocks 23 with one feeder block located on the workside, and the other feeder block located on the gear side of each printing unit 11.

Figure 8:
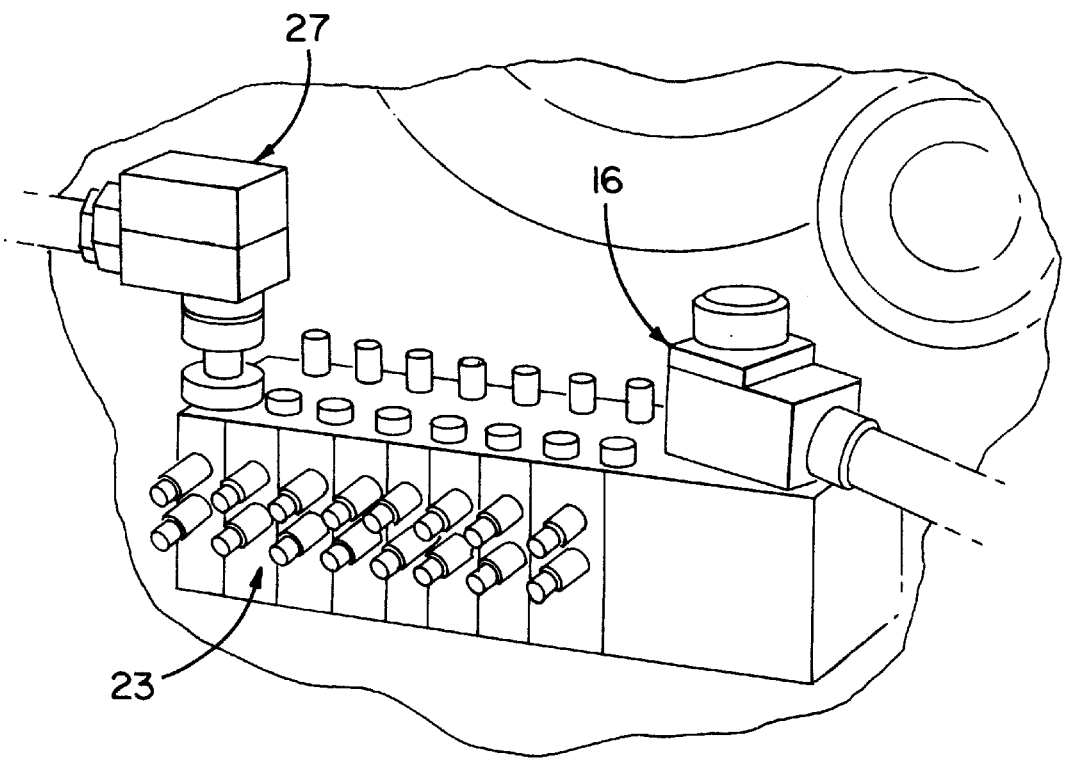
FIG. 8 is a perspective view of a feeder block, a cycle switch and a shunt valve.

The electrical control system 20 includes a complete cycle switch 27 (FIG. 8) which activates at the start of a grease cycle, and again at completion. If the second activation at the completion does not occur within ninety (90) seconds of the first (start) activation, the cycle switch sends a fault message to the control console.

The illustrated shunt valves 16 are preferably formed with a main housing or body 30 (FIG. 2) made of metal or the like which has a central, longitudinally extending bore 32 in which is mounted a reciprocating spool 34. The spool is cylindrical with a diameter closely matched to the diameter of the bore 32 except for a grooved or reduced diameter portion 36. A lubrication inlet passageway or bore 38 extends crosswise at a right angle to the central, axially-extending bore 32 to allow grease to flow into the main bore and out an outlet passageway, or bore 40, aligned across from the inlet passageway 38 when the reduced diameter groove 36 on the spool 34 is aligned with the inlet and outlet passageways 38 and 40.

To shift the spool from a closed position (FIG. 2) where the large diameter portion of the spool 34 closes the flow of grease to an open position where the groove 36 on the spool 34 allows the flow of grease through the valve, there is provided a solenoid 42 at one end of the spool to shift the spool against the force of a return spring 44 acting against the other end of the spool. An actuating plunger or rod 46 of the solenoid abuts one end 48 of the spool and the return spring abuts an opposite end 50 of the spool. The spring is compressed between the spool and an end plug 54 which is threaded into a threaded hole 56 on an end 58 of the valve body.

A problem with this above-described valve 16 is that in use, one or more of the valves would become stuck, usually in the open position, allowing grease to continue to flow through the inlet passageway and about the aligned, grooved portion of the spool and out the outlet passageway. The return spring would be ineffective in pushing the spool to the closed position (shown in FIG. 2). When any shunt valve 16 fails to close, it causes a loss of system pressure. When the system controller tries to close a stuck valve, it then cycles to open the next shunt valve but this next valves does not get enough pressure to cycle in the slotted time and faults out. On the fault out, the press unit goes into a "speed inhibit" state in which the press unit cannot go any faster than the speed at which it is presently operating. Also, if the press unit is decelerated to a lower speed, this lower speed then becomes the limit speed, which cannot be exceeded because of the fault condition. Further, if there is a web break or shut down for any other reason, they cannot pull up the press unit.

In accordance with the present invention, the problem with such faulty valves 16 has been reduced substantially and/or eliminated by providing grease vents in the main valve body such as the grease vent 60 which allows grease flowing into the spring chamber to flow from the spring chamber thereby avoiding a fast accumulation of grease residue in or about the spring. It has been found that grease that flows across the interface between a spool bore wall 32a and a cylindrical wall 34a of the spool collected in the spring chamber and caused a waxy-like build-up of material that interfered with the spring return of the spool to the closed position. It was also found that such a waxy-like residue could build up in the solenoid 42; and, to alleviate this condition, a venting and sealing member 70 was added in accordance with the preferred embodiment of the invention.

In this illustrated embodiment of the invention, a new additional valve body portion or vent and seal body 72 was placed between an end 74 of the main valve body and the solenoid housing 76 with a vent 78 and a seal 80 mounted in the additional body portion. The vent 80 was placed closer to the spool so as to allow any grease slipping past the spool wall and the bore wall to be vented before reaching the seal 80. The seal is a wiping seal with wiping engagement with an elongated road 46 which serves as an extension or a part of the solenoid plunger to actuate the spool. It is preferred to acid another vent hole 84 in the solenoid housing 76 in case grease would flow past the seal 80 and into the solenoid housing, and therefore pass out of the solenoid housing through the vent hole 84.

Preferably, the existing valves are retro-fitted with a vent hole 60 added to the plug 54 and an additional body 70 attached to end 74 of the main valve body. The previously used hex headed solenoid plunger is discarded and is replaced by the new larger rod 96. The solenoid housing 76 is attached to an additional body with the elongated rod 46 extending to the solenoid piston inside an encircling solenoid coil 86. These additional parts may be quickly assembled with the existing valve and the cost of the parts is relatively inexpensive. For original equipment manufacture of valves in the present invention, the vents and seals could be provided in other manners than that described for a retro-fit of existing valves.

Referring now in greater detail to the illustrated embodiment of the invention, the illustrated vent 60 for the valve body is preferably formed in the plug 54 by drilling one or more holes 90 therein from an exterior wall 91 of the plug to an axial bore 92 in the plug, in which is seated a distal end of the compression return spring 44. Manifestly, the size and location of the vent holes for the vent 60 may be changed from that illustrated and described herein.

The additional body portion 72 having the vent 78 and seal 80 is preferably formed from a steel, hexagonal bar (FIGS. 3 and 4). A smaller diameter threaded end 95 is formed on one end of the body portion 72 to match the existing threaded orifice 96 (FIG. 2) in the spool body 30. The threaded end 95 is similar to the threaded end 99 on the solenoid housing that was previously threaded into the threaded orifice 96 of the spool body. The solenoid threaded end 99 now is threaded into a threaded orifice 100 (FIGS. 3 and 4) in an opposite end 102 of the additional body portion 72. By way of example only, the threaded orifice 96, 100 have a thread of about one-half inch deep therein.

To seat the seal 80 for the plunger rod 46, a smaller diameter chamber 107 is formed in the bore in the body portion 72 and is provided below the threaded orifice, as viewed in FIG. 3. The seal 80 is seated against an annual end wall 110 at the bottom of the seal chamber which is perforated by a small diameter axial bore 112 that extends through the threaded end 95. The actuating plunger 46 extends through the bore 112, the seal chamber 107 and the threaded orifice 100. The illustrated seal 80 may be of various kinds or shapes, but herein is a small, annual or ring-shaped seal with an outer annular wall 105 abutting the encircling annual chamber wall of the seal chamber 107. An inturned flange 109 on the seal abuts the bottom wall 110 of the seal chamber. A flexible, annular sealing lip 111 is biased against and surrounds the actuating rod 46, which in this instance, is only 5/32-inches in diameter. The seal 80 functions to limit grease from flowing through the additional body portion 72 and into the solenoid 42.

The vent 78 in the additional body 72 is preferably formed by drilling one or more holes 114 in the body portion 72 from the exterior of the body to the small diameter, axial bore 112. Herein, three holes 114 (FIG. 4) are drilled from the exterior of the body at 120° angular spacing to provide the desired grease vent 78 before the seal 80.

The illustrated solenoid 42 is the same solenoid used to power the shifting of the spool 34 to the open position prior to retro-fitting. The longer actuating rod 46 (FIG. 5) replaces the shorter rod (not shown) of hexagonal cross-section. The hex-shaped, shorter rod abutted against one end of a piston (not shown) in the solenoid and the elongated rod 46 abuts the solenoid piston in the same manner. Hence, the spool is moved through the same distance and with the same power before and after the retro-fitting. Herein, the additional body portion 72 is one-inch in length and the elongated rod 46 is one-inch longer than the replaced hex-shaped rod.

Preferably, the vent 84 in the solenoid body is formed by drilling a hole 118 in the end wall of the solenoid body 76 (FIG. 2) to act as a vent and drain, to allow outflow of any grease that might have flowed past the seal 80. The illustrated hole is only 0.050 inches in diameter and extends from the exterior of the solenoid body into the interior axial bore where the actuating rod 46 is located.

It will be seen from the foregoing that the method of retro-fitting an existing shunt valve 16 involves unscrewing the threaded end 99 of the solenoid body 30 from the threaded orifice 96 on the main valve body 30 and removing and discarding the hex-shaped actuating rod from the solenoid. The additional valve body portion 72 is then attached to the main valve body by threading its threaded end 95 into the threaded orifice 96. Then, the elongated rod 46 is inserted through the additional body portion 72 and its seal 80 into abutting engagement with an end 48 of the spool 34. When the rod is inserted, it travels through the seal 80. The other end of the actuating rod 46 is projected into the axial bore in the solenoid 42 which is attached to the additional body portion 72 by screwing the threaded end 99 of the solenoid into threaded orifice 100 of the body portion 72. This retro-fitting is accomplished quickly and with inexpensive parts.

From the foregoing, it will be seen that the present invention provides a new and improved lubrication shunt valve that eliminates the costly press down-time and the expense of replacing the valves and the loss of expensive lubricant.

What is claimed is:

1. An inlet shunt valve for supplying grease, comprising:
   a valve body;
   an inlet passageway in the valve body for connection to a source of grease;
   an outlet passageway in the valve body for the outflow of grease from the valve body;
   a bore in the valve body connected to the inlet port and outlet ports and through which grease may flow;
   a spool mounted in the bore and movable between an open position, allowing grease to flow through the bore, and a closed position stopping the flow of grease through the bore;
   a spring actuating the spool to one of the open and closed positions;
   a solenoid for actuating the spool to the other one of the open and closed positions and operating in opposition to the spring
   a vent in the valve body adjacent the spring for venting grease to prevent sticking of the valve spool by a buildup of grease residue about the spring; and
   a vent in the valve body adjacent the solenoid to vent grease from building up within the solenoid.

2. An inlet shunt valve in accordance with claim 1 wherein a plunger is operated by the solenoid to shift the spool; and
   a seal is mounted in sealing engagement with the plunger to limit flow of grease into the solenoid.

3. An inlet shunt valve in accordance with claim 2 wherein the valve body comprises:
   a main body portion having the bore with the spool therein;
   a seal and venting body portion having the seal and a vent therein for the solenoid; and
   a solenoid body portion having the solenoid coil therein.

4. An inlet shunt valve in accordance with claim 3 wherein the valve body comprises:
   a spring carrying portion in the main body portion having the spring therein; and
   a plug at the end of the spring carrying portion having the vent therein to vent grease thereby preventing a residue buildup about the spring.

5. An inlet shunt valve in accordance with claim 3 wherein the seal and venting body portion was added to and is affixed between the solenoid and the valve body portion having the spool.

6. An inlet shunt valve in accordance with claim 5 wherein sealing and venting body portion comprises:
   a bore for the solenoid plunger to reciprocate; and
   a vent in the sealing and venting portion being located between the spool and the seal.

7. An inlet shunt valve for use in a printing press lubrication system, comprising:
   a main valve body having a spool in a bore in the main valve body;
   a spring mounted in the main valve body and urging the spool to a closed position to stop flow of grease;
   an inlet bore and an outlet bore in the main body for grease to flow through the spool bore when the spool is in an open position;
   an additional valve body portion having first and second ends and have a straight bore extending therethrough from the first end to the second end;
   the additional valve body portion having its second end secured to the main valve;
   a solenoid secured to the second end of the additional valve body portion;
   a solenoid plunger projecting from the solenoid and through the straight bore of an aligned bore in the main valve body for receiving therein an end of the solenoid plunger which extends from the solenoid body through the straight bore in the additional valve body and into the aligned bore to shift the spool in opposition to the spring; and
   the additional valve body portion having a seal and vent therein.

8. An inlet shunt valve in accordance with claim 7 wherein:
   a plug is attached to the main valve body adjacent one end of the spring; and
   a vent is provided in the plug to vent grease from about the spring.

9. An inlet shunt valve in accordance with claim 8 wherein the additional valve body portion comprises:
   vent holes therein to provide the vent adjacent the spool; and a seal receiving chamber mounting the seal in engagement with the solenoid plunger.

10. An inlet shunt valve in accordance with claim 9 wherein:

the solenoid plunger comprises an elongated rod extending from the spool to the solenoid; and a solenoid piston in the solenoid pushes one end of the elongated rod against the spool and against the return force of the spring.

11. An inlet shunt valve for use in a printing press lubrication system, comprising:

a main valve body having a spool in a bore in the main valve body;

a spring mounted in the main valve body and urging the spool to a closed position to stop flow of grease;

an inlet bore and an outlet bore in the main body for grease to flow through the spool bore when the spool is in an open position;

a solenoid attached to one end of the main valve body and having a plunger to shift the spool in opposition to the spring to the open position;

an additional valve body portion attached to the main valve body and having a seal and vent therein;

an end portion of the main valve body having a threaded orifice through which the plunger extends to shift the spool;

an end portion on the additional valve body portion having a threaded orifice through which the plunger extends;

a threaded end on the additional valve body portion having threaded engagement with the threaded orifice on the main valve body;

a threaded end on the solenoid having threaded engagement with the threaded orifice on the opposite end of the additional valve body portion; and the respective threaded ends on the solenoid and the additional valve body portion being substantially identical and the respective threaded orifices on the main valve body and the additional valve body portion being substantially identical.

\* \* \* \* \*